United States Patent [19]
Azema

[11] Patent Number: 6,077,206
[45] Date of Patent: Jun. 20, 2000

[54] STORAGE DEVICE FOR MACHINE TOOLS

[75] Inventor: Andre Azema, Saix, France

[73] Assignee: Renault Automation, Boulogne-Billancourt, France

[21] Appl. No.: 09/147,231

[22] PCT Filed: May 2, 1997

[86] PCT No.: PCT/FR97/00782

§ 371 Date: Nov. 3, 1998

§ 102(e) Date: Nov. 3, 1998

[87] PCT Pub. No.: WO97/41997

PCT Pub. Date: Nov. 13, 1997

[30] Foreign Application Priority Data

May 3, 1996 [FR] France .................................. 96 05755

[51] Int. Cl.[7] .................................................. B23Q 3/157
[52] U.S. Cl. .................................... 483/3; 483/56; 483/67
[58] Field of Search ............................. 483/2, 3, 56, 58, 483/67, 66, 69, 16, 55, 54

[56] References Cited

U.S. PATENT DOCUMENTS

| Re. 25,583 | 5/1964 | Brainard et al. ......................... 483/3 X |
|---|---|---|
| 3,590,463 | 7/1971 | Burroughs et al. .................... 483/25 X |
| 4,358,888 | 11/1982 | Zankl et al. ............................... 483/54 |
| 4,423,546 | 1/1984 | Scott et al. ................................ 403/29 |

FOREIGN PATENT DOCUMENTS

| 0050797 | 5/1982 | European Pat. Off. . |
|---|---|---|
| 50797 | 5/1982 | European Pat. Off. . |
| 2529127 | 12/1983 | France . |
| 3207141 | 9/1983 | Germany . |
| 186544 | 10/1983 | Japan ......................................... 483/3 |
| 403447 | 6/1966 | Switzerland . |

*Primary Examiner*—William Briggs
*Attorney, Agent, or Firm*—Oblon, Spivak, McClelland, Maier & Neustadt, P.C.

[57] ABSTRACT

A storage device for a machine tool having a ram, includes a cylinder of mounted for rotation in a chamber mounted to a frame of the machine tool adjacent the ram. The chamber has an opening and the cylinder is mounted for rotation about an axis parallel to the axis of the ram. This cylinder has parts for storing tools, a plurality of grippers for gripping a tool to be transferred to the ram, and a flap having dimensions corresponding to dimension of the opening, and mounted on the cylinder at a position such that it seals the opening. The grippers are mounted at angular positions which are different from those of the flap, and so are all protected by the flap when the flap closes the opening.

10 Claims, 4 Drawing Sheets

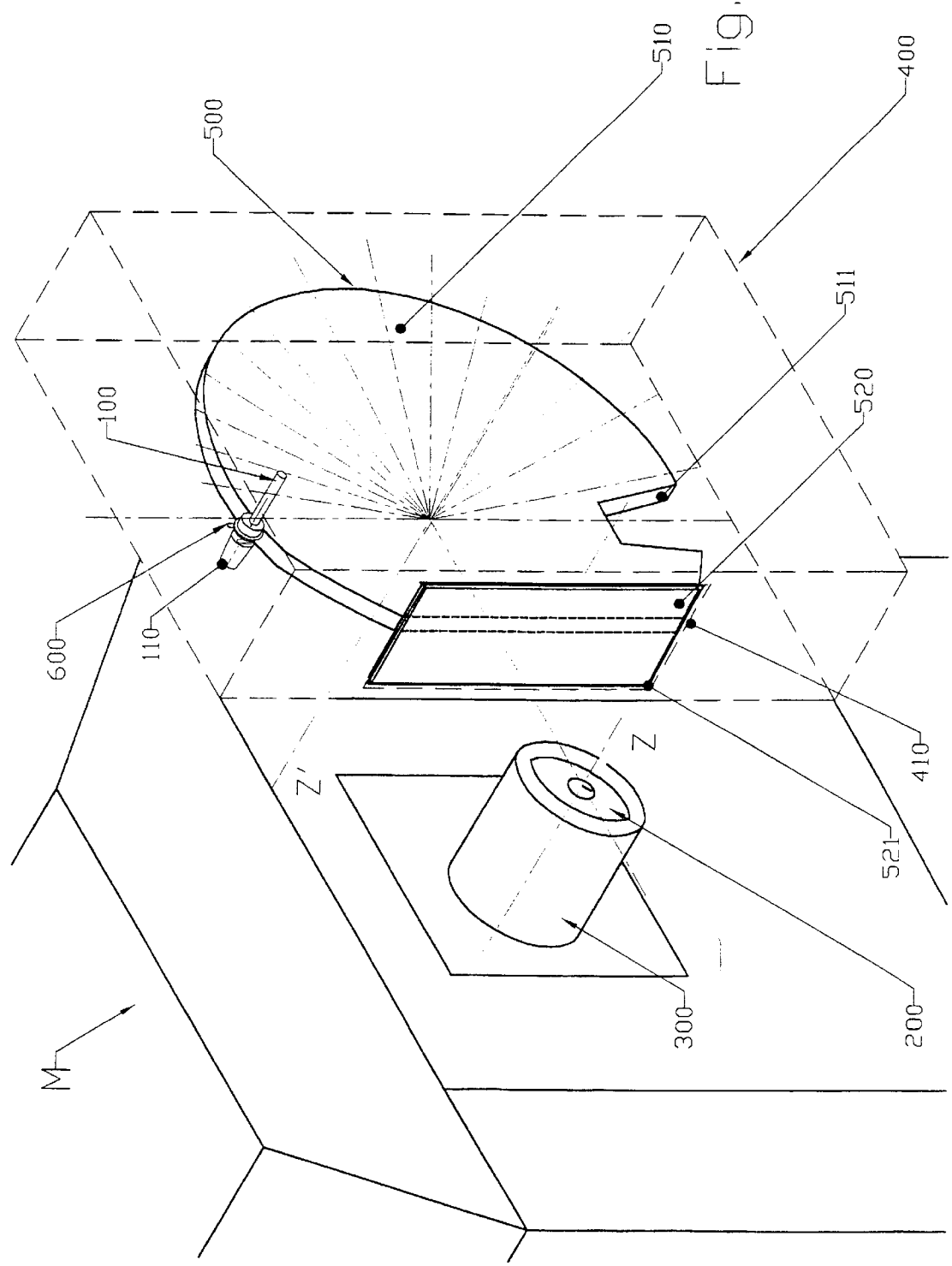

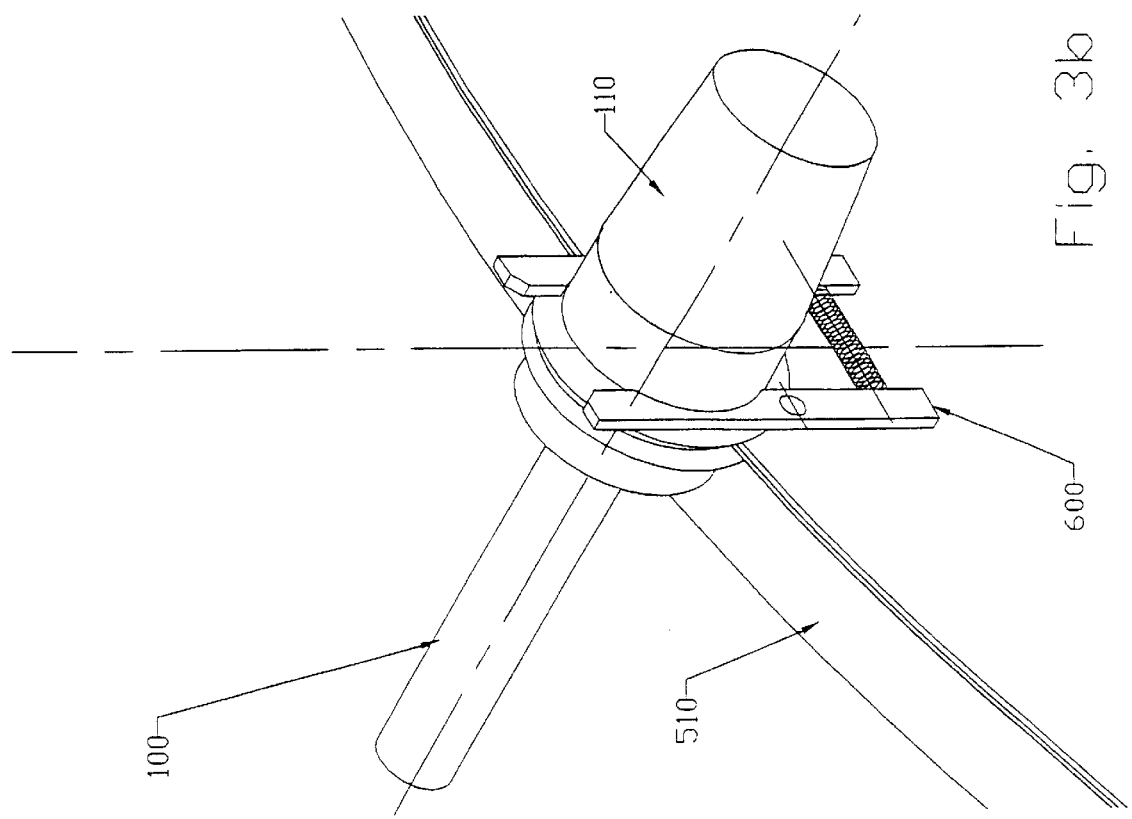
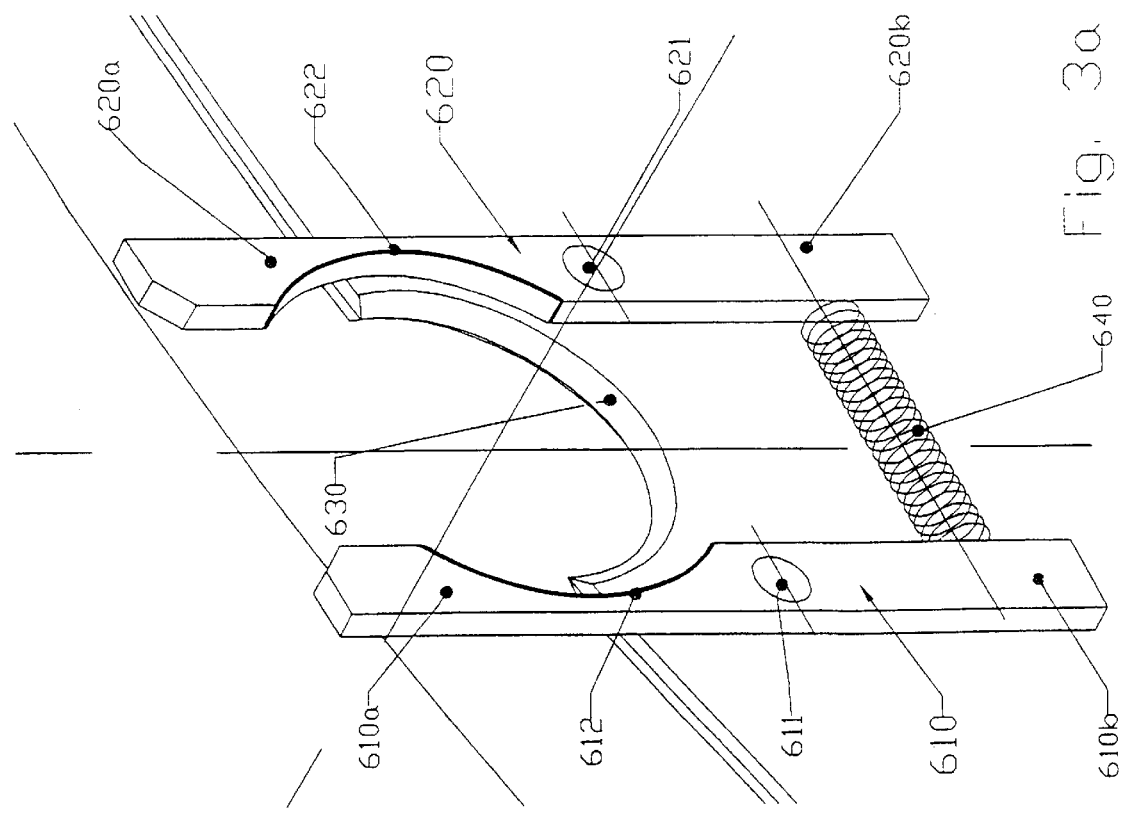

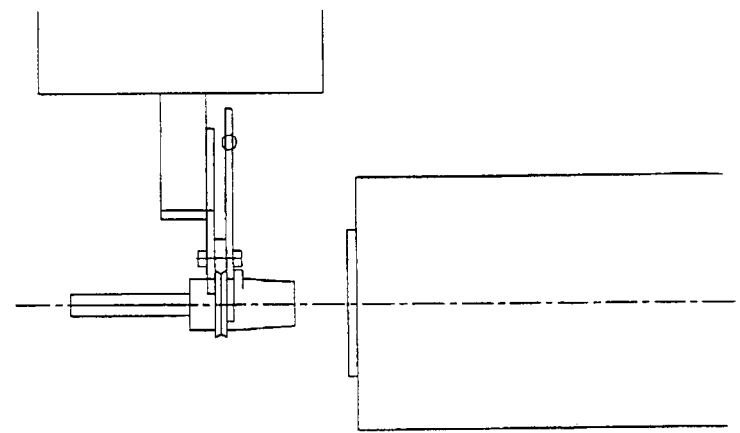
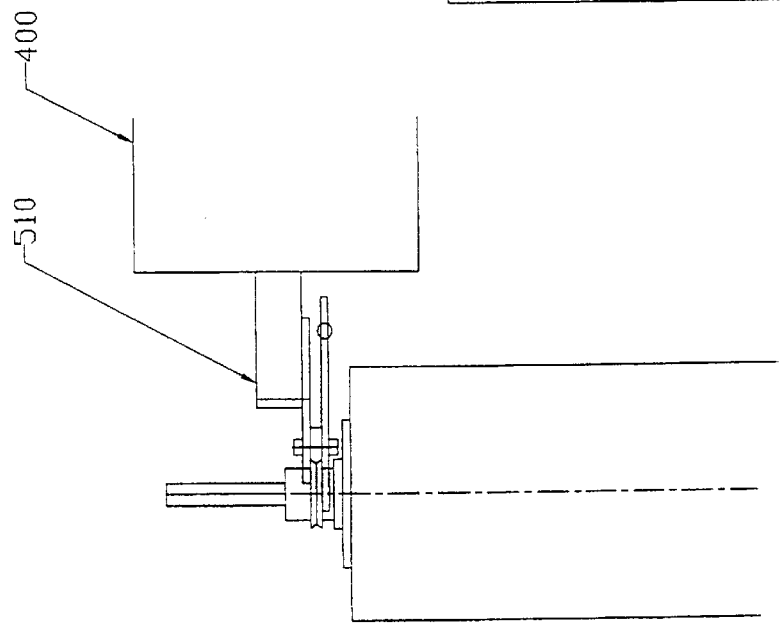
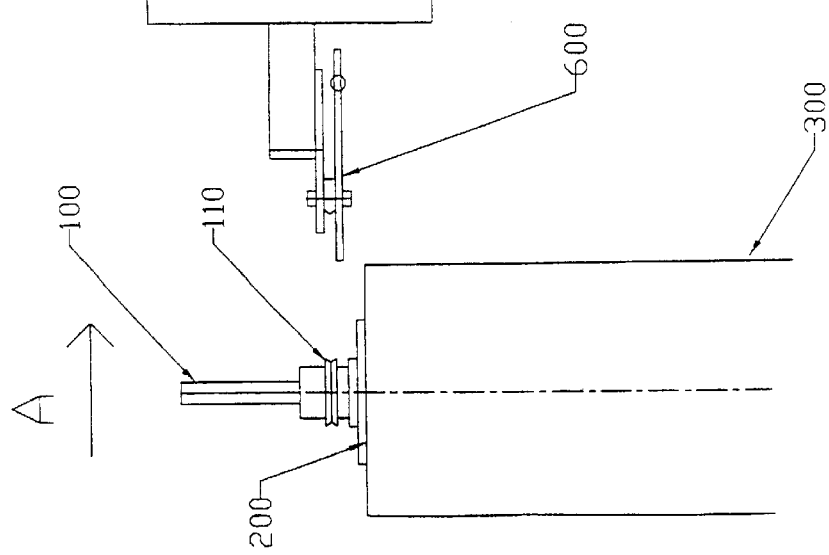

STORAGE DEVICE FOR MACHINE TOOLS

BACKGROUND OF THE INVENTION

1. Field of The Invention

The present invention relates to the field of machine tools and more particularly to modifications ensuring exchange and storing of the tools of a high speed machine tool under the best conditions.

2. Discussion of the Background

High speed machining generally takes place from a tool rotatably driven by the motor driven axis of an electric spindle installed in a ram, which itself is mounted to be movable along three axis X, Y, Z.

A machine tool is classically provided with four main working stations, which are:

an actual machining station, comprising the tool driven rotationally by the motor driven axis of the electric spindle and shaping the workpiece to be machined.

The known device described and represented in patent FR-A-2 529 127 consists of a tool carrier carousel capable of revolving inside a chamber, which chamber is fitted with a revolving part enabling access to the spindle of the machine tool using such a magazine, to the tools and/or to the free machine tool areas. This device nevertheless has several disadvantages which make it useless in a high speed application where all stoppages or auxiliary delays must be reduced to a minimum if no eradicated. The opening of the fixed chamber is independent from the rotation of the carousel which implies an added time for functioning, but also an additional element (a motor). Furthermore, it is the rotation of the spindle which ensures the rotation of the carousel by a direct contact drive, it is therefore compulsory for the spindle to be in direct contact with the carousel to ensure its rotation, which implies an additional time delay as the magazine and the spindle need to be near one another before ensuring rotation of the carousel.

a training station situated upline from the machining station and made up of an ensemble of devices that ensure in particular the X, Y and Z movements of the ram of the electric spindle as well as the feed of the electric spindle for the rotation of its tool carrier axis, a control station cooperating with the drive station and functioning with a program of pre-established instructions to take charge of the different stages of machining of the said workpiece, a magazine for the storage of tools to keep the tools in use near the machining area, during the different stages of machining of the said workpiece.

The classical machining of a workpiece is defined by a machining range comprising successive machining stages depending of the shape to give, and which define the following points:

the machine to be used (milling machine, machine for turning . . . )

the different tools to use (milling tool, drill, threader . . . )

the displacements of the latter, the positionning of the workpiece with regards to the tool.

The machining of a workpiece by a high speed machine tool depends on the machining program conceived by the department of machining engineering which decides on the machining stages during which different tools machine the workpiece according to a pre-established program.

This way of machining requires, near the machine tool, the presence of a tool magazine related to the ram of the machine tool to ensure storage of the tools to be used and their replacement when the machining stage of the machine is changed. Also, as some machining stages require the presence of tools of a large diameter, it is essential for the tool magazine to be able to store large size tools in order to provide for the wide variety of machine functions required by a workpiece.

A high speed machine tool must, by definition, ensure the quick exchange of tools in order to avoid a time delay affecting productivity. The aim of this magazine is therefore, to instantly provide the ram with a housing to enable the storage of the tool of the finished machining stage and a tool which will be used for the next machining stage according to the pre-established program.

The tools are fixed, each one in a tool carrier standard to all tools, and this tool carrier comes into place into the electric spindle fitted in the ram capable of receiving this type of tool carrier thus permitting the use of only one electric spindle. This tool carrier is provided with surfaces of reference ensuring the axial and radial positioning of the tool with regards to the electric spindle, these surfaces guarantee a referenced position of the tool, which is essential in all machining and particularly to the development of the program. A slight defect on these surfaces would result in a bad machining and therefore a bad workpiece or several bad workpieces if the defect was not quickly detected. Therefore, under no circumstances should these surfaces be bent or damaged by any impact or scratch. These surfaces need therefore protection against pollution resulting from machining i.e.: cuttings, oil projections and impacts, a protection difficult to implement in view of the proximity of the ram. Futhermore, should this protection start to fail and let cuttings in, it is very important that these do not build up in the place of storage for the tools.

Another disadvantage of the proximity of the ram, is the impossibility for an operator to have access to the tools in the magazine when the machine is functioning for obvious security reasons.

Taking this into account, the Applicant has carried out research with the aim of improving the storage device for tools of a machine tool, while avoiding the problems created by high speed machining.

SUMMARY OF THE INVENTION

To achieve this objective, this storage device for machine tools placed near the ram, rests on an original concept which is constituted by the association of:

a fixed chamber comprising an opening and associated with the frame of the machine tool, a cylinder revolving in the fixed chamber rotatably driven by a motor driven along an axis parallel to the axis of the ram and comprising a part for the storage of tools and another part for maintaining the seal of the fixed chamber. Thus the magazine, by the sole rotation movement of the cylinder, is able to:

either provide the ram with an empty housing through the opening, or provide the ram with a housing comprising a tool placed in its tool carrier through the opening, or close, thus sealing the opening of its chamber in order to protect the container from all projections coming from the machining.

Another advantage of this characteristic is the use of the cylinder, for storing and gripping the tools, as a sealing system closing the protection chamber around the cylinder in order to make it watertight. There is no further need for additional equipment to ensure protection of the tools and the tool carrier. Moreover, the fact that the ram ensures the loading and unloading of the tools, allows the machine to stop from functioning while changing a tool.

According to a preferred embodiment of the invention, the said cylinder is constituted by two parts:

a cylindrical part comprising peripheral gripping means of the tools placed at appropriated angular intervals, a part making a flap, integral with the cylinder and revolving with it, its profile and dimensions adapting to the profile and the dimensions of the said opening made in the fixed chamber in order to seal this chamber.

Therefore, at every rotation of the motor at a pace equal to the angular interval separating the said gripping means, the cylinder will present, in front of the opening in the chamber, a new gripping means placed on its cylindrical part. Similarly, a rotation of the cylinder by a predetermined angle, will present the said part forming flap in front of the opening made in the chamber, in order to seal this opening.

According to a preferred embodiment of the invention, the opening made in the said fixed chamber, in which the cylinder moves, is lateral and is situated on the side of the ram.

The said cylinder takes the preferred shape of a partially cut crown according to a plan receiving the said flap, the other cylindrical part of the crown receiving peripherically the said gripping means. Therefore, when the cylindrical part of the crown is presented in front of the opening, the gripping means project beyond the chamber, which permits a direct access from the ram to the said empty gripping means or engaged with tools situated outside the chamber, and when the cut side of the crown is presented in front of the opening, the flap adjusts itself on the said opening thus closing the chamber.

Therefore, according to the angle of rotation of the cylinder, either the gripping means come out of the chamber with or without tools, the ram of the machine tool being able to ensure the functions of loading and unloading the tools, or the chamber is closed by the flap and the machine tool is at the machining stage thus allowing the maintenance team to modify the contents of the chamber by a side door conveniently placed, as we will see later on, in the description.

The invention also concerns the embodiment of the gripping means situated peripherically on the cylindrical part of the cylinder, which are remarkable in as far as they are constituted by the association of:

a clamping device made up of two arms of which one end is pre-shaped to encircle the tool carriers in which the tools are housed on an axis parallel to the rotation axis of the cylinder, and of a semicircular cradle in line with the circle made up by the arms of the clamping device in which the tool carriers come into place.

The main advantage of this association is that it ensures a reduction in the size of the clamping device as the tangential acceleration of the cylinder, generated when said cylinder rotates, is taken into account not only by one arm of the clamping device but also by the cradle. In addition, the tool being held by three points (one on each arm and one on the cradle) permits a better seat to the tool. At last, when the tool is held by the clamping device and the ram moving backwards along axis Z to free itself, the cradle holds back the tool in order to relieve the clamping device, as such a process could damage said clamping device.

The tool exchange with the device of this invention is quite easy as explained below. When the machining process with a tool is finished, the ram moves to a position level with the cylinder axis, said cylinder revolving in order to open the magazine and present a free space to receive the tool to exchange. The ram then moves laterally towards the clamping device in order to be in line with the cradle and the circle made up by the arc shaped ends of the arms of the clamping device, so that the tool fits in the cradle and in the clamping device to be tightly held and can be freed from the electric spindle in which it is housed in order to allow the said electric spindle to move backwards. Once the ram has moved backwards, the cylinder executes a second rotation in order to bring the tool to use for the next machining stage, in line to the ram. As said ram moves forward it pushes the tool carrier into the electric spindle governing it, so that when the ram moves backwards laterally it frees the tool from the clamping device. After which, a third rotation of the cylinder allows the flap to be positioned in front of the opening in order to close the magazine, and the machine tool can then start the machining stage corresponding to this second tool.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

The fundamental concepts of the invention having been expressed hereinabove in their most elementary form, more details and characteristics will come out more clearly when reading the description hereinafter, using as a non limitative example and having regard to the attached drawings, an embodiment of a storage device for machine tools according to the invention. This description refers to the enclosed drawings on which:

FIG. 2 is a perspective view of this tool storage device.

FIG. 3a is a perspective view of a gripping means of the storage device.

FIG. 3b is a perspective view of a gripping means of FIG. 3a gripping a tool.

FIGS. 4a, 4b and 4c are top views illustrating the method of storing a tool by the ram in the magazine.

DESCRIPTION OF THE PREFERRED EMBODIMENTS

Figure 1:
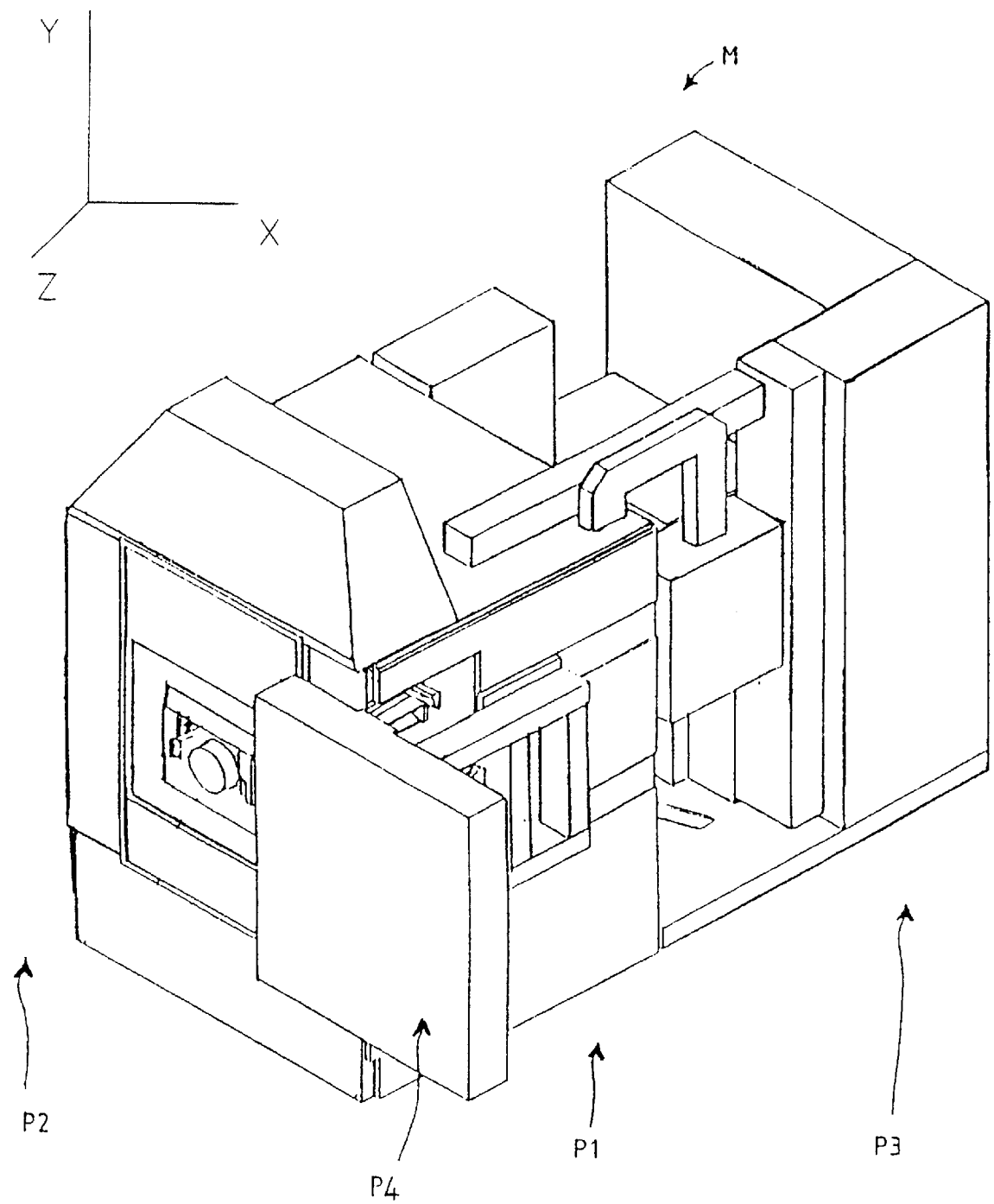
FIG. 1 is a general perspective view of a machine tool fitted with such a tool storage device.

Referring now to the drawings, wherein like reference numerals designate identical or corresponding parts throughout the several views.

As shown on the drawing of FIG. 1, the machine tool referenced as M and of the high speed type comprises four working stations:

training station P1, machining station P2, control station P3, tool storage station P4.

The tool storage station P4 constituted by a tool magazine can be situated on any side of machine M, whether it be on the right, left or even above, as long as it is situated completely symetrically and that the ram is movable in accordance with three axis X, Y and Z.

As can be seen on the drawing of FIG. 2, the tool magazine of station P4 is situated near the actual machining station P2 comprising tool 100 and its tool carrier 110, in which it is housed, rotatably driven by the motor axis of electric spindle 200 sleeved in the ram 300 and shaping the workpiece to be machined (not shown). According to the spirit of the invention, it is constituted by the association of:

- a parallepipedic chamber 400 (shown in broken lines) associated with the frame of machine M in which is a lateral opening 410 of rectangular shape is made,
- and a cylinder 500, rotatably driven in chamber 400 by a motor driven along an axis Z' parallel to axis Z of the ram 300, the said cylinder comprising a part 510 used for storage of tools 100 and another part 520 used to guarantee the sealing of fixed chamber 400 at the level of its lateral opening access 410.

This cylinder 500 takes the shape of a partially cut crown according to a plan receiving part 520 shaping flap of dimensions slightly larger than those of the lateral opening 410 of chamber 400. The other cylindrical part 510 of the crown, receives peripherically the gripping means 600 of tools 100, situated at angular intervals according to the dimension of the tool.

Rotation axis Z' of cylinder 500 is advantageously carried towards the ram 300 of machine tool M in relation to the symetrical axis of chamber 400, in such a way that for a pre-established angle of rotation of cylinder 500, the gripping means 600 of tools 100 are placed outside chamber 400 through the lateral opening 410 and for another pre-established angle of rotation of cylinder 500, the flap 520 arrives in front of opening 410 which it seals. In order to hermetically seal chamber 400 and to protect, under the best conditions, tools 100 from projections due to machining, flap 520 comprises on its profile the sealing elements 521 coming into place between chamber 400 and flap 520 when the said flap 520 is situated in front of rectangular opening 410 of chamber 400 in the closed position of the magazine. The closing and opening of the magazine and the availability of tools 100 to the ram 300 is therefore ensured in accordance with the angle of rotation of cylinder 500, controlled by a pre-established program. So far as the protection of projections due to machining is concerned, the rotation movement of cylinder 500 will be advantageously used to prevent any deposit of cuttings to build up inside fixed chamber 400.

According to a particularly advantageous characteristic of the invention, the cylindrical part 510 of said cylinder 500 comprises at least one angular area in which the gripping means 600 is placed on a radius lower than the peripheral radius on which are placed the other gripping means 600, as well as a slot 511 on this angular area to enable the ram 300 to reach the said gripping means 600. This arrangement permits wide diameter tools to be stored on the cylinder, which could not be achieved on the periphery of the cylinder due to their obstructing effect and the presence of fixed chamber 400. This slot 511 thus gives more possibilities in the machining range and optimizes the flexibility of the machine.

According to a particularly advantageous characteristic of the invention, chamber 400, which stays closed during a tool exchange, is fitted with a rear opening (not shown on drawings) permitting access to the tools during machining of the machine tool to load or unload the magazine.

The drawing of FIG. 3a illustrates one of the gripping means 600 fitting peripherically the crown of cylinder 500. This gripping means 600 is constituted by the association of a semicircular cradle 630, integral with cylinder 500, with a clamping device made up by two arms 610 and 620. Both arms 610 and 620 are pivotally mounted respectively on two axis 611 and 621 integral with cylinder 500. On one side of axis 611 or 621 situated towards the outside of crown of cylinder 500, the ends 610a and 620a of both those arms are arc shaped to surround the tool carriers 110 and on the other side of axis 611 or 621 situated towards the inside of crown of cylinder 500, the ends 610b and 620b are linked one to another by means of a spring 640 ensuring a fixed opening of both arms in the rest position and a clamping of tool carrier 110 when this one is entered in the gripping means 600.

As drawn on FIG. 3b, tool carrier 110 is made up on its base of a cone that widens to become a cylinder, the inside shape of the ends of arms 610 and 620 receiving tool carrier 110 are of circular shape to take on the exact shape of the tool carrier 110. According to a particularly advantageous characteristic of the invention, each of the arms 610 and 620 of clamping device 600 comprise, on the contact zone between the tool carrier 110 and the clamping device, protective elements made of plastic 612 and 622 to ensure a better grip of the clamping device on the tool carrier 110 but also to avoid scratching on the reference surfaces. The semicircular cradle 630, coaxial to the circle made up by the pre-shaped ends 610a and 620a of arms 610 and 620 of clamping device 600, has an upside down V-shaped profile in order to penetrate inside the corresponding shoulder of the tool carrier 110 presenting a V-shaped profile. The advantage of this V-shaped profile, is that it enables centering via the tool carrier 110 and tool 100 in relation with cylinder 500 and it ensures a stop for tool carrier 110 when ram 300 moves backwards to free both tool 100 and tool carrier 110 of electric spindle 200 in which they were housed. Another advantage of this association is that the presence of the cradle permits to withstand part of tha angular accelerations of cylinder 500, thus avoiding to have an outsized clamping device.

FIGS. 4a, 4b and 4c illustrate the storage of a tool 100 with its tool carrier 110 of electric spindle 200 on the storage device P4.

As mentioned at the beginning of the above description, the mobility of ram 300 following axis X, Y, and Z enables magazine P4 to be placed anywhere around ram 300 but respecting a distancing of axis of stored tools when the magazine is in open position, lower than the maximum travel of ram 300 and a position of axis Z' of cylinder 500 parallel to axis Z of ram 300.

Therefore, as shown on the drawing of FIG. 4a, ram 300 comes to the level of axis of cylinder 500 in order to bring the cylinder of tool carrier 110 opposite to the arms 610 and 620 of the clampling device, and so that the shoulder with a V-shaped groove should be situated in front of the semicircular cradle 610. Cylinder 500 starts a rotation to free flap 520 in front of lateral opening 410 and present a gripping means 600 free in front of tool 100 to be stored. The following stage illustrated by the drawing of FIG. 4b consist of making ram 300 move laterally according to arrow A towards opening 410 of chamber 400 until the ram is in line with cradle 630 and to the circle made up by the pre-shaped ends 610a and 620a of arms 610 and 620 of the clamping device so that tool carrier 110 and tool 100 are engaged with the gripping means 600. Tool carrier 110 is then released from electric spindle 200 so that as it moves backwards (see FIG. 4c) ram 300 frees tool carrier 110 which stays gripped in the gripping means 600. Cylinder 500 starts a second rotation in order to present itself in line with the recesses ram 300, a new tool 100 housed in a new tool carrier 110. Ram 300 will then move forward until tool carrier 110 is sleeved in electric spindle 200 in which it will be governed, it will then move backwards laterally to free tool carrier 110 and therefore tool 100 of the gripping means 600. Cylinder 500 is driven into a third rotation bringing it back to its initial position which consists in positioning flap 520 in front of the opening 410 in order to close chamber 400 from the magazine. Machine tool M can then continue with its machining function.

It is understood that the description and illustration just given here above of the storage device for machine tools are given for the purpose of disclosure and not limitation. It is obvious that various arrangements of, as well as modifications and improvements to, the example here above will be possible without departing from the scope of the invention taken in its broadest aspects and spirit. For example it will be possible to use a device of sensors detecting the presence of tools in the cradles to prevent a tool from being placed in a gripping means already engaged with a tool and its tool carrier.

What is claimed is:

1. A storage device for a machine tool having a ram, comprising:

a chamber mounted to a frame of the machine tool adjacent the ram, and having an opening;

a cylinder mounted in the chamber for rotation about an axis parallel to an axis of the ram, the cylinder comprising a part for storing tools, a plurality of gripping means for gripping a tool to be transferred to the ram; and a motor connected for driving said cylinder;

wherein the said gripping means comprise a clamping device made up of two arms of which one end is pre-shaped to encircle tool carriers in which the tools are housed on an axis parallel to the rotation axis of the cylinder, and a semicircular cradle in line with a circle comprised by arms of the clamping device.

2. The storage device of claim 1, further comprising a flap having dimensions corresponding to dimensions of said opening, and mounted on said cylinder at a position such that said flap seals said opening at a rotational position of said cylinder.

3. A The storage device of claim 1, wherein said opening is formed in a side of said chamber adjacent the ram.

4. The storage device of claim 1, wherein the cylinder has a shape of a partially cut crown which receives said flap, and wherein said gripping means are mounted to the periphery of said cylinder at a plurality of angular positions which are different from an angular position of said partially cut crown.

5. Storage device according to claim 1, wherein the chamber comprises a rear opening having means for opening the rear opening only when the machine tool is not in the course of a tool exchange.

6. Storage device according to claim 1, wherein said flap comprises on its profile, sealing elements coming into contact between said flap and the chamber when said flap is in position in front of the opening.

7. Storage device according to claim 1, wherein the rotation axis of the cylinder extends towards the ram in relation to the symetrical axis of the chamber in such a way that the gripping means can stick outside chamber through the opening.

8. Storage device according to claim 1, wherein the cylindrical part of said cylinder comprises at least one angular area in which the gripping means is placed at a radius lower than the peripheral radius on which are placed the other gripping means, as well as a slot on this angular area to enable the ram to reach said gripping means.

9. Storage device according to claim 1, wherein both of the arms of said clamping device are articulated on an axis integral with the cylindrical part of the cylinder and parallel to the axis of the cylinder, and wherein the ends of the said arms opposite to the pre-shaped ends are maintained by a spring ensuring a fixed opening of the arms and a clamping of the tool when it is entered in the preshaped ends.

10. Storage device according to claim 1, wherein both arms comprise on each of their pre-shaped ends on the part coming into contact with the tool carrier in which the tool is housed, protection elements made of plastic.

* * * * *